United States Patent [19]

Erickson

[11] Patent Number: 4,682,658
[45] Date of Patent: Jul. 28, 1987

[54] TILLING APPARATUS FOR PREPARING A RIDGE AND FURROWED FIELD

[76] Inventor: Ward W. Erickson, 55 Boundary Street, Moree New South Wales, 2400, Australia

[21] Appl. No.: 775,611

[22] Filed: Sep. 13, 1985

[30] Foreign Application Priority Data

Sep. 17, 1984 [AU] Australia .............................. PG7166

[51] Int. Cl.⁴ ........................ A01B 33/02; A01B 49/02
[52] U.S. Cl. ..................................... 172/73; 172/182; 172/701
[58] Field of Search ................... 172/1, 63, 65, 68, 70, 172/71, 72, 73, 118, 123, 153, 156, 159, 176, 182, 556, 701

[56] References Cited

U.S. PATENT DOCUMENTS

| | | | |
|---|---|---|---|
| 1,602,244 | 10/1926 | Newton et al. | 172/156 |
| 1,602,782 | 10/1926 | Rippy et al. | 172/156 |
| 3,023,717 | 3/1962 | Cline | 172/701 X |
| 4,267,891 | 5/1981 | van der Lely et al. | 172/123 X |

FOREIGN PATENT DOCUMENTS

| | | | |
|---|---|---|---|
| 2652741 | 12/1977 | Fed. Rep. of Germany | 172/68 |
| 423555 | 2/1911 | France | 172/159 |
| 670259 | 7/1979 | U.S.S.R. | 172/60 |
| 938769 | 6/1982 | U.S.S.R. | 172/123 |

*Primary Examiner*—Richard T. Stouffer
*Attorney, Agent, or Firm*—Marshall, O'Toole, Gerstein, Murray & Bicknell

[57] ABSTRACT

A tilling apparatus for preparing a ridge and furrowed field between cropping. The apparatus comprises a frame adapted to be engaged with and drawn by the three point linkage of a conventional tractor. Rotating hoeing blades which are spaced apart to coincide with ridges in the field are mounted to the frame and driven from the power take-off of the tractor in a sense opposing the drawing direction. The axis of rotation of the hoeing blades is normal to the drawing direction a plurality of L-shaped blades spaced around and direction radially outwardly from a hub. Soil displaced from the ridges into the furrows is used to reform the peaks of the ridges by listers mounted with the frame aft of the hoeing blades and spaced apart to coincide with a furrow separating adjacent ridges. Each lister comprises a corn point oriented in the drawing direction and a pair of plough discs mounted for rotation aft of the corn point.

13 Claims, 4 Drawing Figures

TILLING APPARATUS FOR PREPARING A RIDGE AND FURROWED FIELD

BACKGROUND OF THE INVENTION

1. Field of the Invention

The present invention relates to mechanised tills and particularly to such tills adapted to be towed behind and powered by a conventional farm tractor.

2. Description of the Prior Art

In the cultivation of cotton and similar crops the ground must undergo extensive preparation after a previous crop has been harvested and prior to the sowing of a new crop.

As the crop is often flood irrigated, the ground must be levelled. Ridges are then formed between adjacent furrows by ploughing and listering. The crop is ultimately planted into these ridges which provide suitable drainage and plant access during cultivation and harvesting. It is important that the ridges be spaced equally apart to enable farm machinery to traverse the field without damaging the crop.

After the crop has been harvested the field is slashed removing all but the stump and the roots of the plant. This too must be removed preventing it from regenerating and interfering with the new crop.

Conventionally, in preparation, the field is ploughed, essentially removing the ridges and in so doing destroying the remainder of the previous crop. The ridges are then reformed by listering in readiness for the new crop.

The abovementioned field preparation is time consuming which is of particular concern when cultivating cotton, which is a nine month crop, in a late or wet season when the time prior to the sowing of the new crop is reduced.

Another disadvantage problem associated with the conventional method of preparation is that in its execution, it requires multiple traversements of the field by farm machinery which undesirably compacts the soil.

It is an object of the present invention to provide a method and apparatus able to overcome or at least ameliorate the abovementions shortcoming of the conventional field preparation method.

SUMMARY OF THE INVENTION

This invention consists in a tilling apparatus for preparing a ridge and furrow field between cropping, said apparatus comprising a frame adapted to be drawn by a conventional tractor, a driven plurality of rotating hoeing means mounted with said frame, adjacent hoeing means being spaced apart so as to coincide with adjacent ridges, and a plurality of listers, mounted with said frame, aft of the location of said hoeing means and each spaced apart so as to coincide with a furrow separating adjacent ridges.

For preference, the rotating hoeing means rotate about axes oriented substantially normal to a drawing direction. The direction of rotation of the hoeing means preferably opposes the drawing direction.

The hoeing means can each comprise a plurality of L-shaped blades spaced around and directed radially outwardly from a hub, with the foot of adjacent blades directed in opposing directions substantially parallel to the axis of rotation of the hoeing means.

Also for preference, the rotating hoeing means are connected for conjoined rotation with a power take-off shaft of the conventional tractor and are driven thereby.

The lister preferably comprises a corn point oriented in the drawing direction and a pair of plough discs mounted for rotation aft of the corn point. One of the discs projects outwardly and rearwardly behind each side of the corn point and a face of each disc is inclined upwardly.

A preferred embodiment of the present invention will now be described, by way of example only, with reference to the accompanying drawings.

DESCRIPTION OF THE PREFERRED EMBODIMENT

Figure 1:
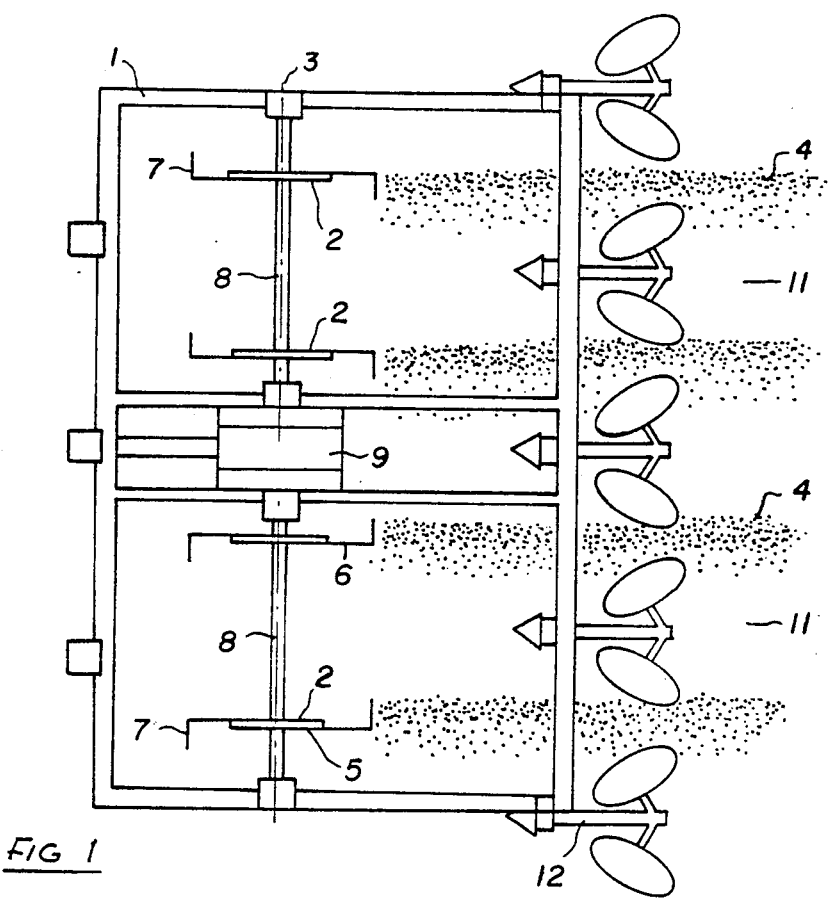
FIG. 1 is a plane view of a tilling apparatus according to the invention.
Figure 2:
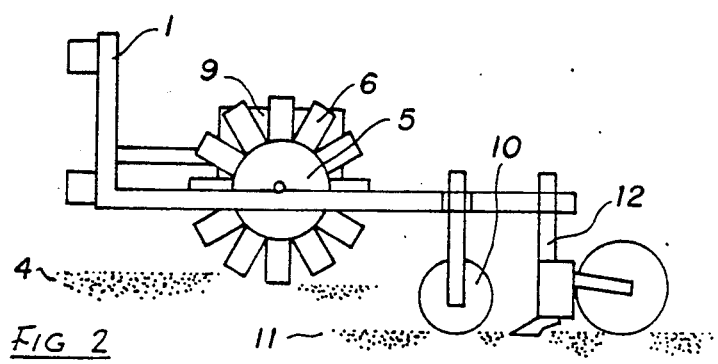
FIG. 2 is a side elevation of the tilling apparatus shown in FIG. 1.

As seen in FIGS. 1 to 4, the tilling apparatus comprises a frame 1, adapted to be engaged with a three point height adjustable, linkage of a conventional tractor and drawn thereby.

Four driven hoeing means 2 are mounted to the frame 1 about an axis 3 oriented normal to a drawn direction. Adjacent hoeing means are spaced apart to coincide with adjacent ridges 4, which are inturn spaced to fall on either side of the tractors wheels.

Each rotating hoeing means 2, comprises a hub 5 having twelve replaceable L-shaped blades 6 spaced evenly therearound. The L-shaped blades 6 are directed radially outwardly from the hub 5 and the feet 7, of adjacent blades 6 are directed in opposing directions substantially parallel to the axis 3. The disks 5 are mounted for conjoined rotation to two axles 8 defining the axis 3. The axles 8 are disposed one at each side of frame 1 and are connected for conjoined rotation with a power take-off shaft of the tractor through a gear box 9.

The sense of rotation of the hoeing means 2, opposes the drawn direction.

In order that the hoeing means only tills the top portion of ridges 4, their height is adjusted by adjusting the height of the frame 1 using the three point linkage. The required height is set and maintained by the provision of a depth adjustable wheel 10, connected with the frame 1, adapted to run along a furrow 11 between two adjacent ridges 4.

Five listers 12 are provided, mounted for height adjustment to frame 1, aft of the location of the hoeing means 2, and each spaced apart so as to coincide with a furrow separating adjacent ridges. In this case one lister 12 is disposed between each hoeing means 2 with an additional lister located outboard of the each of the two outermost hoeing means.

Figure 3:
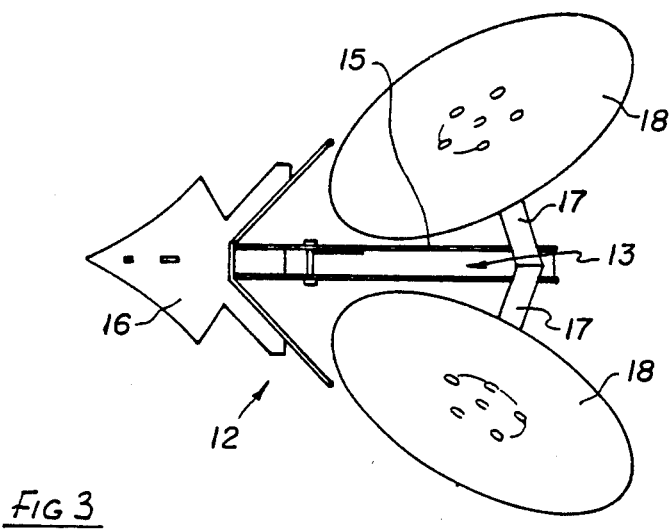
FIG. 3 is an enlarged plane view of a lister shown in FIG. 1.
Figure 4:
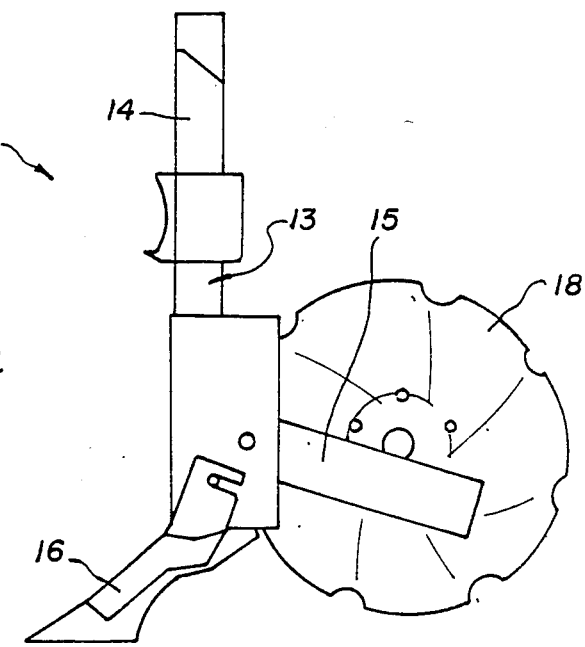
FIG. 4 is an enlarged side elevation of the lister shown in FIG. 3.

Each lister 12 as best shown in FIGS. 3 and 4 comprises a support structure 13, adapted for height adjustable clamping engagement with frame 1, including a vertical member 14 and a rearwardly directed member 15 attached to the lower-end of vertical member 14. A corn point 16 is releasably attached to the lower end of the vertical member 14 and oriented in the drawing direction. A pair of plough disks 18 are mounted for rotation to stub axles 17 aft of the corn point 16. One of the disks 18 projects outwardly and rearwardly from behind the corn point 16 and the axles are inclined such that one face of each plough disk 18 is directed upwardly.

It will be appreciated that the rotation of the plough disks 18, prevents the listers 12 from becoming clogged when operating in damp soil.

In operation the tilling apparatus is used to traverses a ridge and furrowed field between cropping. The hoeing means align with the ridges and the depth wheel is set so that approximately the top 4 inches of each ridge is tilled. This is sufficient to remove the stump and roots of the previous crop as well disturbing any dormant pest larvae. The old crop is thus prevented from rejuvinating and robbing the soil of nutrition while a substantial portion of the ridges is left intact. The listers pass along the furrows behind the hoeing means and throw soil from the furrows onto the ridges to reform the peaks of the ridges.

The tilling apparatus of this invention is thus able to prepare a field between cropping in a single transversment of the field. In addition, the freshly tilled and aerated soil provides an excellent germination medium for the next crop.

The foregoing describes apparatus of only one embodiment and modifications may be made thereto without departing from the scope of the present invention. For example, the rotating hoeing means can alternatively be driven by one or more hydraulic motors powered by the hydraulic system of the drawing tractor.

I claim:

1. A tilling apparatus for preparing a ridge and furrowed field for planting with each ridge having a top and each furrow a bottom, said apparatus comprising:
   a frame adapted to be drawn in a given direction by a tractor;
   a plurality of laterally spaced apart driven hoeing means mounted on said frame to rotate in a direction opposing the drawing direction of the apparatus about an axis substantially normal to said drawing direction;
   each of said hoeing means being adapted to be aligned with a ridge line over which the frame is to be drawn;
   the hoeing means having a bottom of rotation adapted to be positioned so as to be higher than the furrow bottom;
   a plurality of lister means mounted to said frame aft of said hoeing means;
   each of said lister means being spaced laterally from each of said hoeing means, such that one of said lister means is adapted to be aligned with each furrow, and centered between adjacent ridges, over which the frame is to be drawn, when said hoeing means are each aligned with a ridge line; and
   said lister means and said hoeing means being displaced vertically relative to each other with the lister means having a bottom lower than the lowest position of the hoeing means bottom of rotation whereby the hoeing means is adapted to remove the tops or crests of said ridges and any vegetation growing therein and said lister means is adapted to reach the bottom of said furrows to thereby reform the ridge and furrowed field by clearing the furrows and reforming the tops of the ridges with soil displaced from the furrows.

2. An apparatus as claimed in claim 1 wherein said hoeing means each comprises a plurality of L-shaped blades spaced around and directed radially outwardly from a hub with the foot of adjacent ones of said blades directed in opposing directions substantially parallel to the axis of rotation of the hoeing means.

3. An apparatus as claimed in claim 1 wherein each said lister means comprises a corn point oriented in the drawing direction of the apparatus and a pair of plough discs mounted for rotation aft of the corn point, one of said discs projecting outwardly and rearwardly behind each side of the corn point and a face of each of said discs being inclined upwardly.

4. An apparatus as claimed in claim 1 wherein each said lister means is mounted for height adjustment with said frame to vary the depth of said furrows.

5. An apparatus as claimed in claim 1 wherein the apparatus includes means for connection with draw linkage means of a tractor, and a depth adjustable wheel is mounted to said frame to control the depth of tilling of said ridges.

6. An apparatus as claimed in claim 1 including means adapting the hoeing means to be driven by a power take-off of a tractor when said tractor is connected to the apparatus.

7. A tilling apparatus for preparing a ridge and furrowed field between cropping, said apparatus comprising:
   a frame adapted to be drawn in a given direction by a tractor;
   a plurality of driven hoeing means mounted on said frame to rotate in a direction opposing the drawing direction of the apparatus about an axis substantially normal to said drawing direction;
   said hoeing means being respectively spaced apart, so as to be adapted to follow adjacent ridge lines in the field;
   a plurality of listers mounted with said frame aft of said hoeing means with each of said listers being spaced laterally from each of said hoeing means, such that said listers are positionable between the lines adapted to be followed by said hoeing means, said listers being respectively spaced apart, so as to be adapted to be aligned with adjacent furrows in the field when said hoeing means are following the adjacent ridge lines, and said listers and hoeing means being displaced vertically relative to each other along with said listers having a bottom lower than the lowest position of the bottom of rotation of said hoeing means whereby the hoeing means is adapted to remove the crests of said ridges and any vegetation growing therein and said listers are adapted to reach the bottom of said furrows to reform the ridge and furrowed field by clearing the furrows and reforming the tops of the ridges with soil displaced from the furrows.

8. An apparatus as claimed in claim 7 wherein said hoeing means each comprises a plurality of L-shaped blades spaced around and directed radially outwardly from a hub with the foot of adjacent ones of said blades directed in opposing directions substantially parallel to the axis of rotation of the hoeing means.

9. An apparatus as claimed in claim 8 wherein each said lister comprises a corn point oriented in the drawing direction of the apparatus and a pair of plough discs mounted for rotation aft of the corn point, one of said discs projecting outwardly and rearwardly behind each side of the corn point and a face of each of said discs being inclined upwardly.

10. An apparatus as claimed in claim 7 wherein each said lister comprises a corn point oriented in the drawing direction of the apparatus and a pair of plough discs mounted for rotation aft of the corn point, one of said discs projecting outwardly and rearwardly behind each side of the corn point and a face of each of said discs being inclined upwardly.

11. An apparatus as claimed in claim 7 wherein each said lister is mounted for height adjustment with said frame to vary the depth of said furrows.

12. An apparatus as claimed in claim 7 wherein the apparatus includes means for connection with draw linkage means of a tractor, and a depth adjustable wheel is mounted to said frame to control the depth of tilling of said ridges.

13. An apparatus as claimed in claim 7 including means whereby adapting the hoeing means to be driven by a power take-off of a tractor when said tractor is connected to the apparatus.

* * * * *